US011235865B2

(12) United States Patent
Cox et al.

(10) Patent No.: US 11,235,865 B2
(45) Date of Patent: Feb. 1, 2022

(54) AIRCRAFT ELECTRIC TAXI SYSTEM DESIGN AND OPERATION

(71) Applicant: Borealis Technical Limited, North Plains, OR (US)

(72) Inventors: Isaiah W. Cox, London (GB); Jan Vana, Prague (CZ); Joseph J. Cox, Portland, OR (US); Yonatan Rotenberg, Miami, FL (US)

(73) Assignee: Borealis Technical Limited, Isle of Man (IM)

( * ) Notice: Subject to any disclaimer, the term of this patent is extended or adjusted under 35 U.S.C. 154(b) by 397 days.

(21) Appl. No.: 16/207,118

(22) Filed: Dec. 1, 2018

(65) Prior Publication Data

US 2019/0168864 A1    Jun. 6, 2019

Related U.S. Application Data

(60) Provisional application No. 62/593,517, filed on Dec. 1, 2017.

(51) Int. Cl.
*B64C 25/36* (2006.01)
*B64C 25/50* (2006.01)

(52) U.S. Cl.
CPC .............. *B64C 25/36* (2013.01); *B64C 25/50* (2013.01)

(58) Field of Classification Search
CPC ............................. B64C 25/405; B64C 25/50
See application file for complete search history.

(56) References Cited

U.S. PATENT DOCUMENTS

| 122,007 | A | * | 12/1871 | Grier | ..................... B64C 25/405 |
| 200,425 | A | * | 2/1878 | Batchelder | ............ B64C 25/405 |
| 307,777 | A | * | 11/1884 | Leggo | ..................... B64C 25/40 |
| 9,567,068 | B2 | | 2/2017 | Perkins et al. | |
| 9,725,161 | B2 | | 8/2017 | Cox | |
| 10,106,249 | B2 | | 10/2018 | Edelson et al. | |
| 2015/0253773 | A1 | | 9/2015 | Cox et al. | |
| 2015/0375854 | A1 | | 12/2015 | Abel et al. | |
| 2016/0052624 | A1 | | 2/2016 | Edelson | |
| 2017/0121012 | A1 | | 5/2017 | Lazarovich et al. | |

FOREIGN PATENT DOCUMENTS

WO    WO2012106643 A1    8/2012

* cited by examiner

*Primary Examiner* — Joshua J Michener
*Assistant Examiner* — Nor Alaa Bashash

(57) ABSTRACT

A method for designing and operating an aircraft nose landing gear wheel-mounted electric taxi system to move aircraft with optimal torque during a broad range of ground travel conditions. Electric taxi system components may be sized to produce optimal ground travel torque to move aircraft during the majority of aircraft ground travel conditions and operated to produce a maximum or breakaway torque to move the aircraft with the electric taxi system when a higher level of torque is required. Turning the nose landing gear wheels to a selected angle or through a range of angles simultaneously as the electric taxi system is operated produces the breakaway torque required to get the aircraft moving. When lower torque is needed, the aircraft may be driven with the nose landing gear wheels parallel to the longitudinal axis to produce optimal torque for electric taxi system-powered aircraft ground travel.

7 Claims, 3 Drawing Sheets

AIRCRAFT ELECTRIC TAXI SYSTEM DESIGN AND OPERATION

PRIORITY CLAIM

This application claims priority from U.S. Provisional Patent Application No. 62/593,517, filed 1 Dec. 2017, the entire disclosure of which is fully incorporated herein.

TECHNICAL FIELD

The present invention relates generally to electric taxi systems for moving aircraft independently without operating engines during ground operations and specifically to a method for moving aircraft with electric taxi systems that ensures optimal torque production by the electric taxi systems to move the aircraft during a broad range of ground travel conditions.

BACKGROUND OF THE INVENTION

Electric taxi systems that drive aircraft during ground travel independently without operation of the aircraft's main engines and external tow vehicles have been proposed by Applicant and others. Conventionally, these systems are expected to provide the torque required to drive aircraft nose or main landing gear wheels and to move an aircraft during ground operations. However, the design and operation of conventional electric taxi systems does not necessarily ensure that motors and other components of these systems produce the torque required to move an aircraft equipped with an electric taxi system during a broad range of operational or ground travel conditions. Such operational and ground travel conditions may include both situations when it is difficult to move the aircraft and situations when it is not difficult to move the aircraft or to keep the aircraft moving. Examples of ground travel conditions when it may be difficult to move an aircraft include, inter alia, push back of the aircraft from a gate or parking location and weather or other situations that cause an aircraft to be slowed or stalled during ground travel. Breakaway torque may be needed to get the aircraft moving in these situations.

Motors for electric taxi systems may be conventionally designed to provide a larger amount of torque than may actually be required during operation of the electric taxi system to drive the aircraft in most ground travel conditions. This is done to ensure that the electric taxi systems are capable of meeting maximum torque requirements during those ground travel conditions when maximum or breakaway torque is required to move the aircraft. As a result, the design of conventional electric taxi systems focuses on providing motors that will meet the highest torque requirements likely to be needed to move an aircraft during the most difficult aircraft ground travel conditions. Such motors may produce more torque than is actually needed to drive an aircraft during most ground travel and may present design and weight challenges for the electric taxi systems and the aircraft landing gear wheels and landing gears where they are installed. The operation of conventional electric taxi systems to optimize torque production by the electric taxi system and ensure that breakaway torque may be effectively produced in ground travel situations requiring this level of torque to get the aircraft moving has not been addressed.

There is a need, therefore, for an alternative approach to designing and operating aircraft electric taxi systems so that these systems have the capability for producing optimal torque to drive aircraft during most ground travel conditions, as well as the capability for producing a higher level of torque when maximum or breakaway torque is required to move the aircraft during challenging ground travel conditions. There is also a need for an electric taxi system with the foregoing capability that does not pose design and weight challenges or require motors and components that are over-engineered or oversized for operation of the electric taxi system during the majority of ground travel conditions.

SUMMARY OF THE INVENTION

Accordingly, it is a primary object of the present invention to provide an alternative approach to designing and operating aircraft electric taxi systems with motors and other components so that these systems have the capability for producing optimal torque to drive aircraft during a broad range of ground travel conditions, as well as the capability for producing a higher level of torque when maximum or breakaway torque is required to move the aircraft during challenging ground travel conditions.

It is another object of the present invention to provide an electric taxi system with the foregoing capability that does not pose design and weight challenges or require motors and components that are over-engineered or oversized for operation of the electric taxi system during the majority of ground travel conditions.

It is an additional object of the present invention to provide a method for operating an aircraft nose landing gear wheel-mounted electric taxi system to ensure that breakaway torque is produced by the electric taxi system during operation to move aircraft in a broad range of ground travel conditions, including those that require breakaway torque to move the aircraft.

It is a further object of the present invention to provide a method for operating an aircraft nose landing gear wheel-mounted electric taxi system with a motor that may be engineered to achieve optimal torque during operation of the electric taxi system to move the aircraft during ground travel when breakaway torque is not required and for operating the electric taxi system to produce breakaway torque when breakaway torque is required to move the aircraft.

It is yet another object of the present invention to provide a method for operating an aircraft nose landing gear wheel-mounted electric taxi system that incorporates angles at which the nose landing gear wheels may be turned away from a position parallel to a longitudinal axis of the aircraft into calculations of required maximum torque production by motors and other components of the electric taxi system so that the electric taxi system may be operated to produce an optimal level of torque to move the aircraft during any ground travel conditions.

In accordance with the aforesaid objects, an aircraft nose landing gear wheel-mounted electric taxi system and a method that facilitates the design and operation of an aircraft nose landing gear wheel-mounted electric taxi system to move an aircraft with optimal torque during a broad range of ground travel conditions are provided. Electric taxi systems may be designed with motors and components sized to produce optimal torque requirements to move aircraft during the majority of aircraft ground travel conditions. The nose landing gear wheel-mounted electric taxi system may be operated simultaneously in conjunction with nose landing gear steering as the aircraft is driven to meet maximum torque requirements and move the aircraft during ground travel conditions when higher maximum and/or breakaway torque is needed. Correlation of nose landing gear wheel angle when the aircraft's nose landing gear wheels are turned at angles from a longitudinal axis of the aircraft with the level of torque produced by an electric taxi system motor and components may be effectively used to design the electric taxi system motors and components and to operate the electric taxi system to move the aircraft. Turning the nose landing gear wheels through a range of angles may enable the electric taxi system to produce a level of torque required to move an aircraft during breakaway conditions. At other times when lower torque is needed, the aircraft may be driven with the nose landing gear wheels parallel to the longitudinal axis to produce optimal torque for electric taxi system-powered aircraft ground travel. Aircraft equipped with the electric taxi systems described herein may be driven with the electric taxi systems at optimal torque levels during a wide range of ground travel conditions requiring different levels of torque to move the aircraft.

Other objects and advantages will be apparent from the following description, drawings, and claims.

DESCRIPTION OF THE INVENTION

Figure 1:
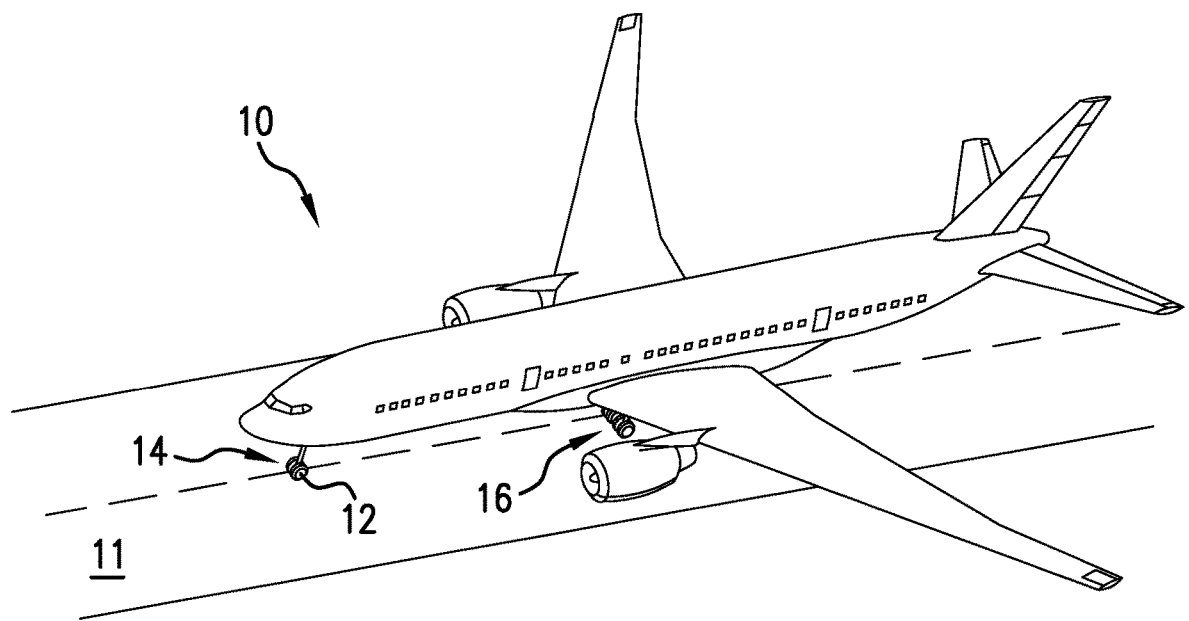
FIG. 1 illustrates an aircraft equipped with nose landing gear wheel-mounted electric taxi systems for ground travel independently of operating engines moving on a runway.

The benefits and advantages of using electric taxi systems to move aircraft during travel on ground surfaces without operating engines and external tow vehicles have been acknowledged. Applicant is developing electric taxi systems that may be designed and operated to efficiently provide the torque required to move passenger and other similarly-sized commercial aircraft during a broad range of different ground travel conditions likely to be encountered as the aircraft are driven with the electric taxi systems between landing and takeoff, including on airport runways and taxiways and into and out of airport terminal ramps with gates and parking locations. Electric taxi systems move aircraft using torque produced by the cooperative action of the electric taxi system components, including torque produced by an electric drive motor. The torque is translated to one or more landing gear drive wheels where the electric taxi system components are mounted to drive the landing gear drive wheels and move the aircraft during ground travel. The maximum torque that the electric taxi system may generate should, ideally, correspond to a maximum level of torque that might be required to move the aircraft in a broad range of ground travel conditions, including those when breakaway torque may be required to get the aircraft moving.

Breakaway torque is typically required to move an aircraft from a stationary or stopped condition, such as at push back. Breakaway torque may also be required to move an aircraft that is cold-soaked, heavy, or otherwise difficult to move. Breakaway torque is usually equivalent to the maximum torque needed to move an aircraft under the foregoing and potentially under other selected ground travel conditions. These ground travel conditions and situations do not occur during most of an aircraft's electric taxi system-powered ground travel, and the level of torque required to move an aircraft with an electric taxi system during the majority of ground travel is much lower than the breakaway or maximum torque needed in these selected ground travel conditions and situations that are infrequently encountered during ground travel.

Motors and other components for electric taxi systems are typically designed and sized to generate the maximum torque that may be required in a breakaway situation. However, this maximum level of torque is not required to move an aircraft with the electric taxi system motor and components during the majority of its ground travel. Consequently, sizing electric taxi system motors and components to produce the infrequently required maximum torque may produce undesirable design and weight consequences for not only the electric taxi system, but also the landing gear drive wheels where the electric taxi systems are mounted, and the aircraft landing gear supporting the electric taxi system. Instead of requiring electric taxi systems to be capable of operating at a maximum or breakaway level of torque on a constant basis, electric taxi systems may be designed and operated to produce an optimal lower level of torque required for the majority of electric taxi system-powered aircraft ground travel and to ensure that the electric taxi system will be able to generate a higher level of torque when needed to move the aircraft during these typically infrequent instances. The present method enables the design and operation of an electric taxi system that can meet optimal torque requirements to move an aircraft during most ground travel conditions and that can also produce torque levels that meet maximum and breakaway torque requirements without undesirable design, weight, or other consequences.

Applicant has determined that there is a correlation between the torque and/or linear force required to move an aircraft on a ground surface with an electric taxi system and the angle at which the nose landing gear wheels are turned from a position parallel to a longitudinal axis of the aircraft. A lower torque is needed to move the aircraft when the nose landing gear wheels are turned at a sharp angle than when the nose landing gear wheels are aligned parallel to the longitudinal axis of the aircraft. It was observed that the minimum breakaway torque required to move an aircraft is significantly reduced when the nose landing gear wheels are turned at an angle to one side of the longitudinal axis. Electric taxi systems may be designed with motors and other components that are sized to produce optimal torque levels required for the majority of electric taxi system-powered aircraft ground travel and that are also capable of producing higher breakaway and maximum torque levels in the relatively few situations when this higher level of torque is needed to move the aircraft.

The torque provided by the motors and components of electric taxi systems may be determined and tested in relation to angles at which the nose landing gear wheels are turned as described below. With the method of the present invention, it is possible to design electric taxi systems with motors and components that produce an optimal torque for moving the aircraft during the majority of ground travel conditions likely to be encountered. It is also possible to operate the electric taxi systems simultaneously in conjunction with nose landing gear wheel steering to produce the higher breakaway or maximum torque when needed to move the aircraft during push back and during the other limited ground travel situations requiring higher levels of torque to move an aircraft.

Referring to the drawings, FIG. 1 shows an aircraft 10 after landing on a runway 11. The aircraft 10 is equipped with an electric taxi system 12 controllable by a pilot or crew of the aircraft to drive the aircraft on the ground. An electric taxi system is preferably located in each one of a pair of nose landing gear wheels 14. Only one nose landing gear wheel 14 is visible in FIG. 1. The pilot-controlled aircraft electric taxi systems developed by the inventors of the present invention may be mounted completely within each of the aircraft's nose landing gear wheels, so that each of the nose landing gear wheels equipped with an electric taxi system functions as a drive wheel. The aircraft's main landing gear wheels visible in FIG. 1 are indicated at 16. It is contemplated that electric taxi systems may also be located in one or more of the main landing gear wheels 18.

Each electric taxi system 12 may include at least an electric motor designed to generate sufficient torque to power the nose landing gear drive wheel within which it is mounted and to move the aircraft at a range of desired torques and speeds during a broad range of ground operations, a gearing or other type of drive system, and a clutch or other torque transfer system controllable to selectively transfer an optimal torque required to power the drive wheel through the electric taxi system and to drive the aircraft on the runway 11, within an airport ramp or apron area, or on another ground travel surface.

Figure 2:
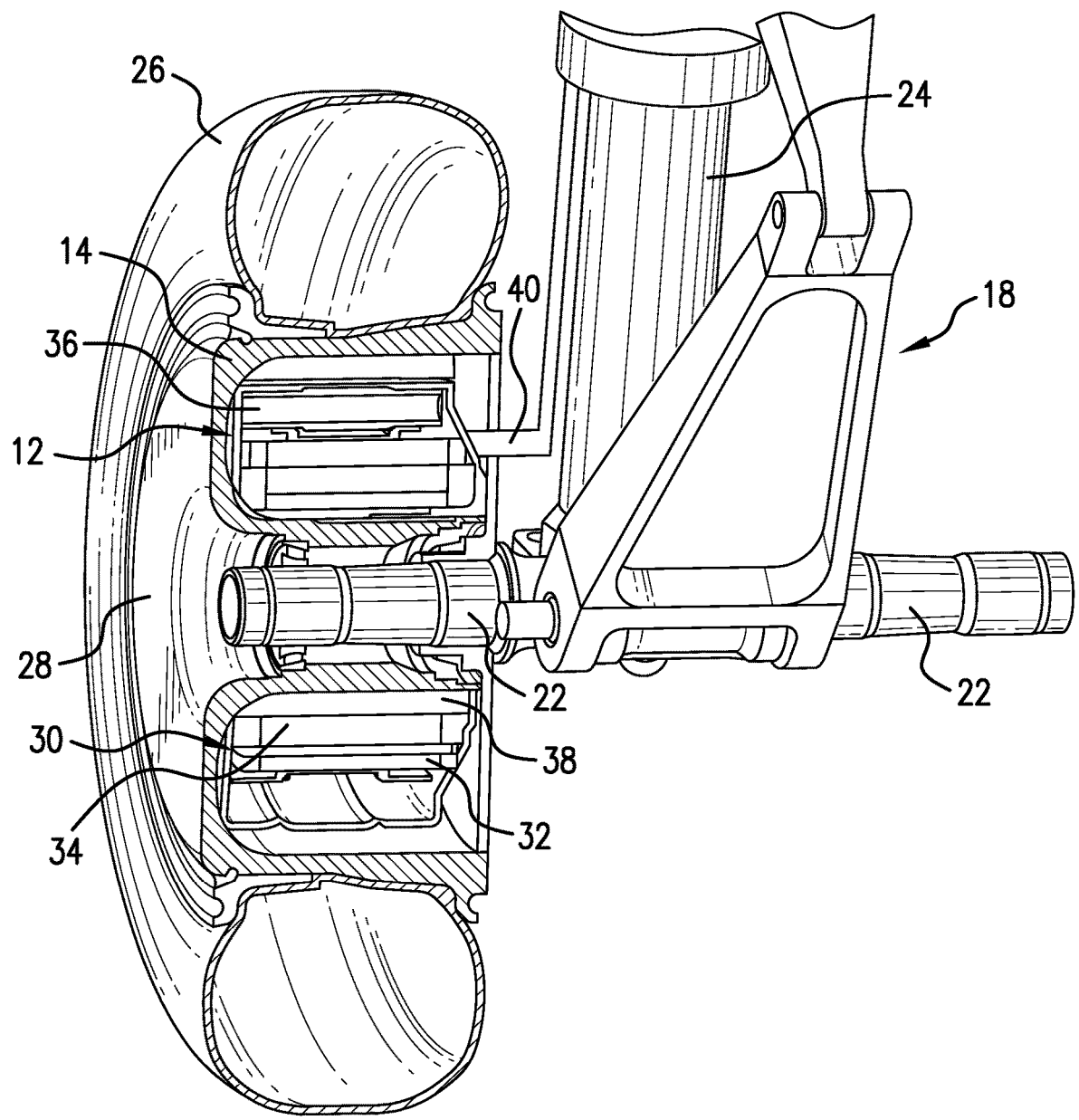
FIG. 2 illustrates one embodiment of an electric taxi system that may be designed and operated according to the present invention mounted within an aircraft nose landing gear wheel.

FIG. 2 illustrates a perspective cross-sectional schematic view of one embodiment of an electric taxi system 12 that may be designed to produce optimal torque to move an aircraft during a broad range of ground conditions in accordance with the present invention. The electric taxi system 12 is shown mounted completely within an aircraft nose landing gear wheel 14 supported on an aircraft nose landing gear 18. The components of the electric taxi system are shown diagrammatically and partially in cross-section relative to each other and to the nose landing gear wheel 14. An optimal design for an electric taxi system may employ other arrangements of these or functionally equivalent electric taxi system components, and this is contemplated to be within the scope of the present invention.

The nose landing gear wheel 14 is shown rotatably mounted on an axle 22. A second nose landing gear wheel (not shown), which is a mirror image of the nose landing gear wheel 14, will also be rotatably mounted on a second axle 22 supported on the nose landing gear 18. Each axle 22 may be attached to a conventional nose landing gear strut 24 at an inboard extent. The wheel 14 supports a tire 26. An outboard wheel hub section 28 may be positioned at an outboard extent of the nose landing gear wheel 14 and the axle 22. All of the components of the electric taxi system 12 may be housed completely within the volume of the wheel 14 as shown.

In the electric taxi system embodiment shown in FIG. 2, an electric drive motor 30, preferably with a rotor element 32 and a stator element 34, may be mounted in a portion of the wheel 14 adjacent to the axle 22. A gear system 36 may be positioned outwardly of the drive motor 30 to provide torque transfer and speed change functions. The gear system 36 may be replaced by a roller traction drive or equivalent system. A clutch assembly 38 may be positioned within the landing gear wheel 14 to connect the wheel 14 to the drive motor 30 through the gear system 36 and transfer torque during operation of the electric taxi system. The clutch assembly 38 may be activated automatically or manually to engage and disengage the gear or drive system 36 into and out of actuation with the drive motor 30o and wheel 14, as required, so that the electric taxi system 12 may power and drive the nose landing gear wheel 14 and move the electric taxi system-equipped aircraft on an airport ground surface.

Electric power to operate the electric drive motor 30 in the electric taxi system may be provided to the electric drive motor by a wire harness 40 or like wiring connection to a source of electric power. For example, the wire harness 40 may be connected to a supply of electric power located within the aircraft, such as the aircraft's auxiliary power unit (APU), batteries, or another source of electric power capable of meeting the power supply demands for an electric taxi system designed to generate the levels of optimal and breakaway or maximum torque described herein.

Figure 3:
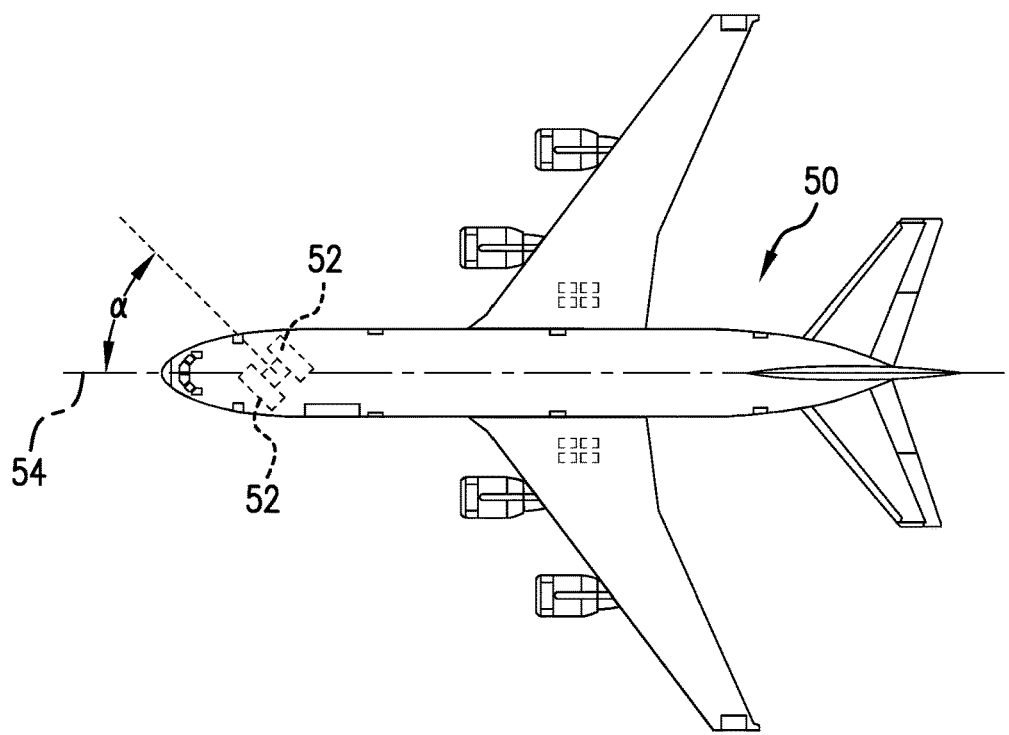
FIG. 3 is a diagrammatic top view of an aircraft equipped with electric taxi systems in each one of a pair of nose landing gear wheels showing one possible nose wheel steering angle useful for increasing torque produced by motors and components of the electric taxi systems during electric taxi system-powered ground travel.

FIG. 3 is a diagrammatic top view of an aircraft 50 equipped with electric taxi systems in both nose landing gear wheels 52 showing one nose wheel steering angle that may increase torque produced by an electric drive motor, for example electric drive motor 30, designed for the electric taxi systems operated in accordance with the present method. The nose landing gear wheels 52, which are exaggerated and not drawn to scale for purposes of illustration, are each equipped with an electric taxi system (not shown), such as that illustrated in FIG. 2, and are shown turned at an angle a from the longitudinal axis of the aircraft, represented by dashed line 54. As noted above, Applicant has determined that when the nose landing gear wheels are simultaneously turned at an identified angle, preferably a sharp angle as defined herein, relative to the aircraft longitudinal axis 54, a drive motor in a nose landing gear wheel-mounted electric taxi system may be designed and sized to produce a level of torque that may be significantly reduced below a level of maximum or breakaway torque that may otherwise be required. The effective torque produced by the electric taxi 10 system during operation of the system to move the aircraft when the nose landing gear wheels are turned at the angle a may actually be doubled over the torque that the electric taxi system motor would produce when the nose landing gear wheels are positioned parallel to the aircraft axis 54. Previously, electric taxi systems had to be designed to produce breakaway or maximum levels of torque at all times during operation of the electric taxi system to drive the aircraft on the ground, even when this high level of torque was not required. The present system and method permit the design and operation of electric drive motors and associated components in nose landing gear wheel-mounted electric taxi systems that produce a lower level of torque that is optimal for almost all aircraft ground movement. These electric taxi systems may be operated in conjunction with nose landing gear wheel steering to produce maximum or breakaway torque only when actually needed to get the aircraft moving.

To illustrate, if an electric taxi system must produce about 2,000 pound feet (lb ft) or 2,712 Newton meters (Nm) of torque to move an aircraft during most ground travel conditions, but must also be capable of delivering about 4,000 lb ft (5,423 Nm) when a maximum or breakaway amount of torque is required, the current design of an electric taxi system requires the system to deliver the 4,000 lb ft (5,423 Nm) amount of torque during all electric taxi system-powered ground travel. Now, electric taxi systems may be designed so that the electric motor and gearing or other drive system is required to reliably deliver the lower amount of optimal torque needed for most aircraft ground travel. For example, these electric taxi systems may be engineered to produce about 2,000 lb ft (2,712 Nm) of torque when the aircraft is driven with the nose landing gear wheels 52 parallel to the longitudinal axis 54 of the aircraft, which occurs during most ground travel. The 2,000 lb ft (2,712 Nm) of torque produced by an electric taxi system drive motor in this electric taxi system may be increased to about 4,000 lb ft (5,423 Nm) of torque when the nose landing gear wheels are simultaneously turned at the sharp angle α shown in FIG. 3 as the electric drive motor in the electric taxi system is operated to drive the aircraft. This higher level of torque (4,000 lb ft or 5,423 Nm) is typically about the level of breakaway or maximum torque required to get an aircraft moving from a stopped or similar condition. The exact breakaway or maximum level of torque required to get a stopped aircraft moving may vary somewhat, depending on the kind of aircraft. It is contemplated that other breakaway or maximum torque values may also be produced in accordance with the present invention.

The sharp angle α at which the nose landing gear wheels are turned from the aircraft longitudinal axis 54 to achieve these results may vary over a range of angles from about 1 degree to about 90 degrees from the aircraft longitudinal axis 54. The effective torque scaling will depend on the specific angle α at which the nose landing gear wheels are turned from the longitudinal axis 54 and may be outside the foregoing range in a particular ground condition or ground travel situation. The direction in which the nose landing gear wheels are turned away from a position parallel to the aircraft longitudinal axis may depend on the ground travel situation in which the breakaway or maximum torque is required. It is contemplated that a pilot driving the aircraft with the nose landing gear wheel-mounted electric taxi systems described herein may turn the nose landing gear wheels with the nose wheel steering to the right or to the left through the described range of angles to find a sharp angle and a direction that produce a sufficient level of breakaway torque to get the aircraft moving as the electric taxi systems are operated to drive the aircraft.

The situations and ground travel conditions requiring an electric taxi system to deliver the higher maximum or breakaway torque levels referred to above to move an aircraft may include push back from a gate or parking location and when the aircraft is stopped or stationary for other reasons. This may occur during cold weather, when an aircraft is heavy, and when the aircraft does not move easily, for whatever reason. In the event of a slow or stalled breakaway, the electric taxi system is more effective in breaking away when the nose landing gear wheels are turned at a sharp angle α within the rage of 1 to 90 degrees from the aircraft longitudinal axis 54 as described. The torque produced by the electric taxi systems, as noted, may be effectively doubled by turning the nose landing gear wheels with the electric taxi systems to a sharp angle as described above and allowing the aircraft to move its nose a few feet to the side when starting off with the electric taxi systems. The foregoing process contrasts with current push back procedures, which are conducted with the nose landing gear wheels aligned parallel to the aircraft's longitudinal axis 54. Current pushback procedures require more torque from the electric taxi system to move the aircraft when the nose landing gear wheels are aligned parallel to the aircraft's longitudinal axis than when the nose landing gear wheels are turned to a sharp angle as described above and shown in FIG. 3.

Once the maximum or breakaway torque and the optimal torque for the majority of ground travel conditions are determined for electric taxi system-powered ground travel in a specific kind of aircraft, the electric taxi system motor and components may be designed and sized to reliably produce about half or slightly more than half of the maximum level of torque likely to be required to move the aircraft during the most challenging breakaway and ground travel situations. The effective torque output of the electric taxi system motor may be tested by correlating the specific nose landing gear wheel angle from the aircraft longitudinal axis that is required for an electric taxi system to produce the desired maximum torque to move the aircraft when the electric taxi system is operated simultaneously with the nose landing gear wheels turned at the specific angle. When the appropriate nose landing gear angle has been determined, pilots of the electric taxi system-powered aircraft may be instructed to turn the nose landing gear wheels to this angle and to maintain the angle while the electric taxi system is simultaneously controlled to produce the breakaway torque needed to move the aircraft. After the aircraft has broken away and can move, the pilot may turn the nose landing gear wheels so that they are parallel to the aircraft axis, and the electric taxi system will produce the lower level of optimal torque needed to move the aircraft under all other ground travel conditions.

Figure 4:
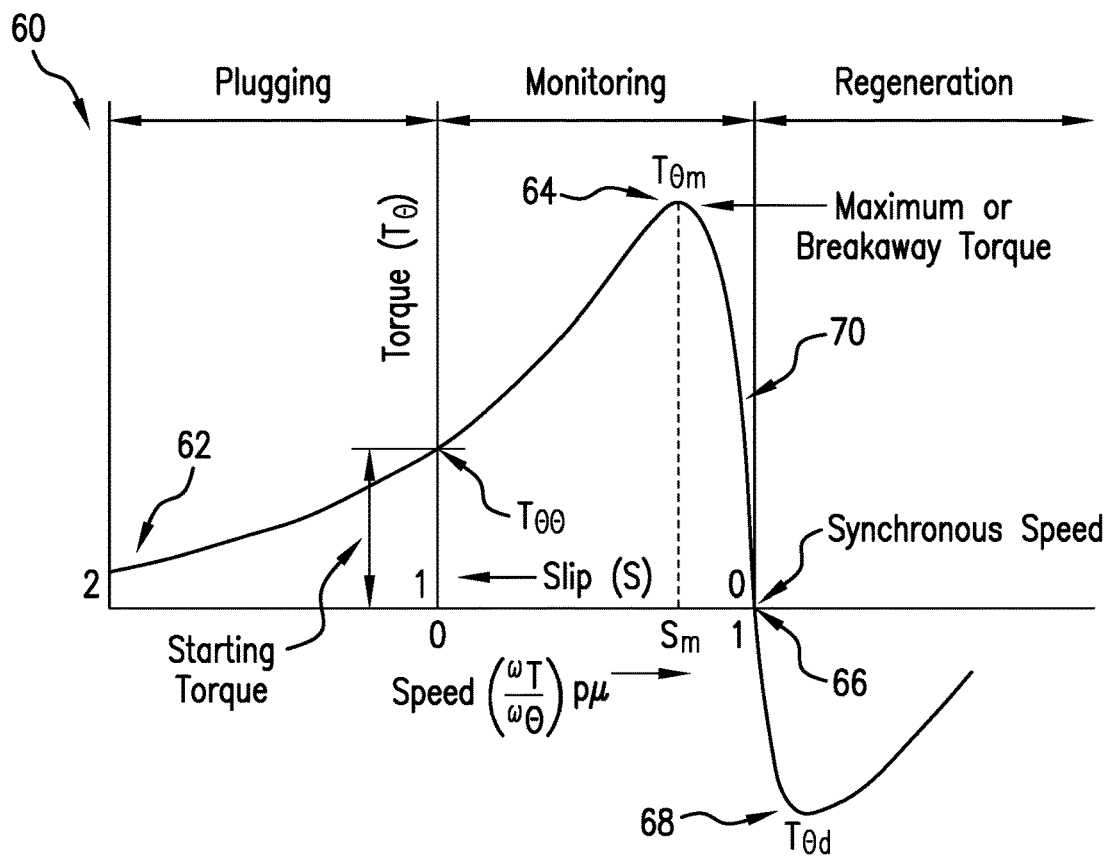
FIG. 4 is a graphical representation of torque considerations during aircraft ground movement powered by nose landing gear wheel-mounted electric taxi systems.

FIG. 4 presents a graphical representation of torque considerations during aircraft ground movement in aircraft powered by electric taxi systems and illustrates a torque/speed curve for an electric drive motor that is controllable to produce optimal torque, as well as traction control, which may be an issue in breakaway situations. Both the electric drive motor selected to power an electric taxi system and drive an aircraft and its load may be described by their torque/speed curves and their inertia. Normal steady state operation occurs at the point where torque supplied by the electric drive motor equals the torque consumed by the load. Any difference between torque supplied and torque consumed means that speed must change. The rate of speed change is determined by the torque difference and the connected inertia.

FIG. 4 illustrates an exemplary torque/speed curve 60 for a high efficiency induction electric drive motor. This type of motor may be mounted within an aircraft nose landing gear wheel, as shown in FIG. 2, and may be effectively operated to power an electric taxi system and drive the aircraft nose landing gear wheel. It can be seen from FIG. 4 that the torque/speed curve starts at a negative speed at 62, reaches a peak 64 at maximum or breakaway torque or speed, drops roughly linearly to zero at synchronous speed, represented at 66, and then falls asymptotically to zero again at 68. Such motors produce nominal full torque at about 50 revolutions per minute (RPM) below the synchronous speed, and the essentially linear output torque is the difference between synchronous speed and actual speed. Peak torque is generally 2 to 3 times the nominal operating torque; generally regeneration peak torque is not equal to motoring peak torque. The torque/speed curve of FIG. 4 is a steady state approximation with its own dynamics.

An electric motor torque/speed curve is directly controlled by electrical operating parameters, including, for example, drive frequency and drive voltage, preferably through an inverter in communication with the electric drive motor. Drive frequency sets motor synchronous speed, and the inverter directly controls the drive frequency. The synchronous speed is the speed at which the drive motor's torque falls through zero, as shown at 66 in FIG. 4. Above the synchronous speed, the drive motor actually acts as a generator and produces a negative or braking torque. This can introduce an important failure mode, since extensive regeneration will cause DC rail voltage to increase, and inverter components can be damaged. The drive voltage sets motor magnetic flux density, which sets the magnitude of the curve. An induction electric drive motor has a characteristic torque/speed curve that stays relatively constant in overall shape. Setting the synchronous speed sets where this curve crosses the speed axis, and the applied voltage acts as a scale factor on this curve. Magnetic flux density can adjust the torque scale, and synchronous speed slides the curve from side to side.

Because a motor torque/speed curve is controlled by two parameters, generally any specific single value of torque and single value of speed is a member of a family of different torque/speed curves. As a result, operating voltage can be traded for slip. The difference between speed of the electric drive motor's rotor (32 in FIG. 2) and synchronous speed is identified as rotor slip and is expressed as a fraction of synchronous speed or as rotor slip frequency and expressed in Herz (Hz) or in radians per second. Normal electric drive motor operation generally uses a rotor slip frequency of less than 2 to 3 Hz, which indicates operation in the nearly linear region 70 of the torque/speed curve of FIG. 4 between breakaway torque and synchronous speed. Ideally, a torque/speed curve can be predicted, given different drive voltage and frequency inputs and motor state inputs, including temperature and the like. The method of the present invention can use this information in connection with information relating to electric drive motor torque output produced when an aircraft's nose landing gear wheels are turned at a sharp angle demonstrated to effectively reduce torque by about half as the aircraft is driven on the ground with the electric taxi system simultaneously with the landing gear wheels turned to facilitate the design and testing of electric taxi system motors and components.

In addition to facilitating design and operation of drive motors and other components for electric taxi systems when motor torque output is combined with turned aircraft nose landing gear wheels to reduce the torque or linear force required to move the aircraft, the techniques for reducing torque of the present method may also be employed to improve effective traction between the aircraft wheels and ground surfaces. Less force needs to translate from tires on the wheels to the tarmac or other ground surface, and reducing the tractive effort is shown to improve traction. In a situation in which one or both wheels try to break away from the ground surface, the method proposed herein may reduce torque so that the aircraft does not break away. Instead of reducing the torque needed, traction may be improved as the pilot moves the aircraft with the nose landing gear wheels turned.

The present method additionally contemplates operating the nose landing gear wheel-mounted electric taxi systems engineered as described herein when a ground travel condition or situation is encountered that may require the higher breakaway or maximum torque to move an aircraft, particularly one that does not have a torque sensor on board. In this method of operation, the nose landing gear wheels with the electric taxi drive systems will be positioned parallel to the aircraft longitudinal axis, and the electric taxi systems will be activated and powered to drive the aircraft with the nose landing gear wheels parallel. If the torque produced by the electric taxi systems does not cause the aircraft to break away, the nose landing gear wheels may be then be turned to a sharp angle from the longitudinal axis, and the electric taxi systems may be operated to drive the aircraft. If the angle initially selected does not produce sufficient torque to move the aircraft, the landing gear wheels may be turned to a greater angle before trying to move the aircraft, and this process may be repeated until the wheels are turned to a sharp angle that allows the aircraft to break away. Once the aircraft is able to move, the landing gear wheels may be turned parallel to the longitudinal axis, and the aircraft may be driven with the electric taxi systems at the lower optimal torque described above. The foregoing process may be particularly useful in situations when sideways and off-track movement of an aircraft should be minimized.

The method described herein facilitates design and operation of drive motors and components for nose landing gear wheel-mounted electric taxi systems capable of producing an effective torque that will meet lower torque requirements for the vast majority of aircraft ground travel conditions, as well as the greater torque requirements for breakaway situations, and has been described with respect to preferred embodiments. Other, equivalent, processes and structures are also contemplated to be within the scope of the present invention.

INDUSTRIAL APPLICABILITY

The present method facilitates the design and operation of motors and components for aircraft electric taxi systems capable of producing an optimal torque that will meet requirements for the vast majority of aircraft ground travel conditions and the greater torque requirements for breakaway situations and will find its primary applicability in the design and operation of aircraft electric taxi systems to ensure that electric taxi systems and electric taxi drive motors and system components are optimally sized and operated to produce torque required during a broad range of aircraft ground travel conditions powered by the electric taxi systems.

The invention claimed is:

1. A method for moving an aircraft equipped with landing gear wheel-mounted electric taxi drive systems during breakaway ground operations and situations requiring a breakaway level of torque to get the aircraft moving and during ground travel operations that do not require a breakaway level of torque to move the aircraft, comprising:
   a. providing an aircraft equipped with landing gear wheel-mounted electric taxi drive systems comprising at least electric drive motors designed and having a size to produce a level of ground travel torque that moves the equipped aircraft during the ground travel operations not requiring a breakaway level of torque when the electric taxi drive system drives the aircraft with nose landing gear wheels maintained in a position parallel to a longitudinal axis of the aircraft, wherein the ground travel operations not requiring a breakaway level of torque comprise most electric taxi drive system-powered ground travel of the equipped aircraft and the breakaway ground operations requiring a breakaway level of torque comprise at least pushback and the equipped aircraft becoming stationary, stalled, and difficult to move;
   b. providing a nose landing gear steering system in the equipped aircraft operable by a pilot to turn the nose landing gear wheels through a range of angles with the longitudinal axis of the aircraft within the range of from about 1 degree to about 90 degrees;
   c. moving the equipped aircraft with the electric taxi drive systems producing the level of ground travel torque and the nose landing gear wheels maintained in the parallel position parallel during ground travel operations requiring the level of ground travel torque;

d. during a breakaway ground operation or situation requiring a breakaway level of torque, turning the nose landing gear wheels to a specific angle α within the range of angles that produces the breakaway level of torque, operating the electric taxi drive systems, and causing the equipped aircraft to move out of the breakaway ground operation or situation at the breakaway level of torque with the operating electric taxi drive systems and the nose landing gear wheels simultaneously turned to the specific angle α; and e. turning the nose landing gear wheels of the broken away equipped aircraft from the specific angle α to the parallel position and continuing to move the equipped aircraft during the ground travel operations not requiring the breakaway level of torque with the nose landing gear wheels in the parallel position and the operating electric taxi drive systems producing the ground travel torque.

2. The method of claim 1, wherein when the breakaway ground operation comprises pushback of the equipped aircraft, further comprising turning the nose landing gear wheels within the range of angles and identifying a specific angle α that produces the breakaway level of torque and causes the equipped aircraft to move with the electric taxi drive systems operating simultaneously with the nose landing gear wheels turned to the specific angle α, producing the breakaway torque required for pushback of the equipped aircraft and moving the equipped aircraft with the nose landing gear wheels turned to the specific angle α and the simultaneously operating electric taxi drive systems, then turning the nose landing gear wheels from the specific angle α to the parallel position and continuing to move the aircraft at the ground travel torque with the operating electric taxi drive systems and the nose landing gear wheels in the parallel position.

3. The method of claim 1, wherein when the breakaway ground operation comprises moving the equipped aircraft in a stationary, stalled, or difficult to move situation, further comprising turning the nose landing gear wheels within the range of angles and identifying a specific angle α that produces the breakaway level of torque and causes the equipped aircraft to move with the electric taxi drive systems operating simultaneously with the nose landing gear wheels turned to the specific angle α, producing the breakaway torque required to get the equipped aircraft moving and moving the equipped aircraft out of the stationary, stalled, or difficult to move situation with the nose landing gear wheels turned to the specific angle α, then turning the nose landing gear wheels from the specific angle α to the parallel position and continuing to move the aircraft at the ground travel torque with the operating electric taxi drive systems and the nose landing gear wheels in the parallel position.

4. The method of claim 1, further comprising determining the ground travel torque and the breakaway torque for a specific kind of equipped aircraft and providing an electric drive motor for each electric taxi drive system having a size that produces a level of ground travel torque comprising about half of the breakaway torque during the majority of electric taxi drive system-powered ground travel of the specific kind of equipped aircraft, and the breakaway level of torque in the breakaway ground operations and situations when the specific kind of equipped aircraft is driven with the electric taxi systems and the nose landing gear wheels simultaneously turned to the specific angle α.

5. The method of claim 4, further comprising testing effective torque output of the electric drive motor in the specific kind of equipped aircraft in a breakaway ground operation or situation by correlating the specific nose landing gear wheel angle α with the breakaway torque that moves the specific kind of equipped aircraft out of the breakaway ground operation or situation and moving the specific kind of aircraft out of the breakaway ground operation or situation with the nose landing gear wheels turned to the specific nose landing wheel angle α and the simultaneously operating electric taxi drive systems.

6. The method of claim 5, further comprising identifying the specific nose landing gear wheel angle α required to produce the breakaway level of torque and move the specific kind of equipped aircraft out of the breakaway ground condition or situation and instructing pilots of the specific equipped aircraft in the breakaway ground condition or situation to turn the nose landing gear wheels to the identified specific angle α and maintain the nose landing gear wheels at the identified specific angle α while simultaneously operating the electric taxi drive systems and producing the required breakaway level of torque, and, when the specific kind of equipped aircraft has broken away, to turn the nose landing gear wheels parallel to the aircraft longitudinal axis and to continue to move the specific kind of equipped aircraft with the nose landing gear wheels in the parallel position and the electric taxi drive systems producing the ground travel level of torque.

7. An aircraft nose landing gear wheel-mounted electric taxi drive system designed to produce ground travel torque during most electric taxi drive system-powered aircraft ground travel and operated to produce breakaway torque during ground conditions and situations requiring breakaway torque, comprising:

a. an aircraft equipped for pilot-controlled ground travel with an electric taxi drive system mounted completely within each wheel of a pair of nose landing gear wheels, each said electric taxi drive system having components comprising at least an electric drive motor with a rotor element and a stator element, a clutch assembly connecting said electric drive motor to said nose landing gear wheel, and a gear system;

b. said aircraft being further equipped with nose landing gear wheel steering pilot-operable to move said pair of nose landing gear wheels from a position parallel to a longitudinal axis of said aircraft and through a range of angles of from about 1 degree to about 90 degrees from said aircraft longitudinal axis; and c. said electric taxi drive systems having a size and being operative to produce a level of ground travel torque lower than a level of breakaway torque to power said nose landing gear wheels and move said equipped aircraft with said nose landing gear wheels in said parallel position during ground travel when said level of breakaway torque is not required to move said aircraft, wherein said level of ground travel torque required to move said aircraft with said operating electric taxi drive systems and said nose landing gear in said parallel position during most of said equipped aircraft ground movement is about half of a level of breakaway torque required to move said aircraft with said operating electric taxi drive systems and said nose landing gear wheels turned to a specific angle α within said range of angles in specific ground conditions and situations requiring said level of breakaway torque to get said aircraft moving.

* * * * *